Patented Mar. 11, 1941

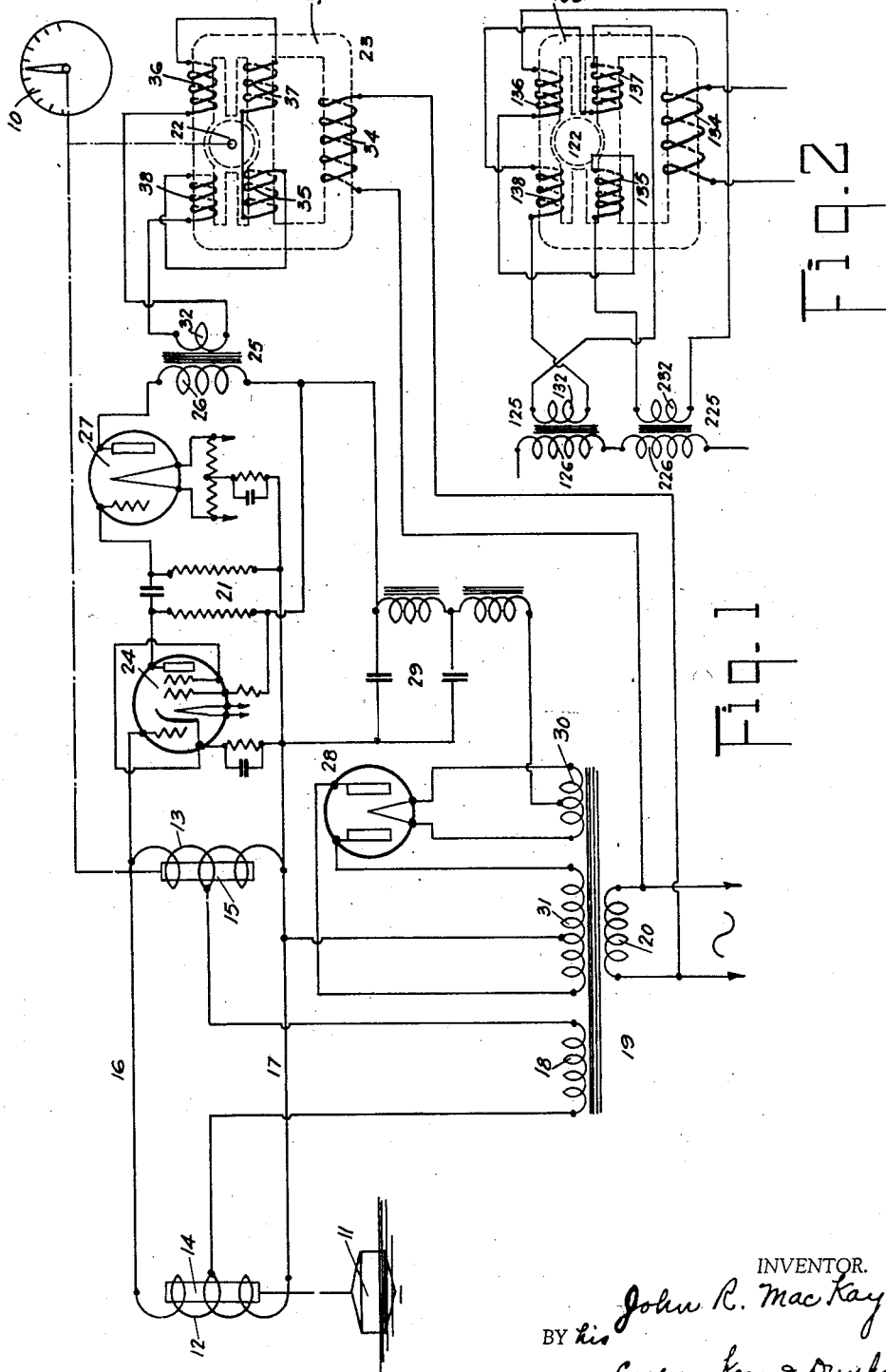

2,234,349

UNITED STATES PATENT OFFICE 2,234,349

MOTOR CONTROL APPARATUS

John R. MacKay, West Caldwell, N. J., assignor to Wallace & Tiernan Products, Inc., Belleville, N. J., a corporation of New Jersey Application April 17, 1936, Serial No. 74,895

1 Claim. (Cl. 172—239)

This invention relates to systems for indicating, repeating, or reproducing, movements of an object, usually at a distance. From a more specific aspect, it relates to telemetric systems.

One of the objects of the invention is to provide a system of the class described which is both sensitive and powerful. Other objects and advantages will appear upon reading the following written description of what I now consider to be a preferred form of my invention and the principle thereof, and the best mode in which I have contemplated applying that principle.

In Fig. 1 of the drawing I have illustrated, somewhat diagrammatically, what I now consider a preferred embodiment of my invention.

Fig. 2 is a fragmentary diagrammatic view showing a modified form of connections.

While my invention is applicable in other environments and for other purposes, within the scope of the appended claim, it will be assumed that it is to be applied to the indication (at 10) of the positions of a float 11, i. e. the level of a liquid, at a remote point.

The particular form of invention illustrated in Fig. 1 comprises a group of instrumentalities for producing a controlling E. M. F. in accordance with movement of the object whose position is to be indicated or repeated, in the particular case, a float; a group of instrumentalities for producing current variations under the control of the controlling E. M. F.; and a translating device under control of the current variations for actuating the indicator or repeating instrument.

While other forms of instrumentalities may be employed for producing the controlling E. M. F., such, for example, as a resistance bridge or a capacity bridge, I have shown an inductance type of bridge which I shall now proceed to describe.

The inductance bridge illustrated comprises two identical stationary inductance coils 12, 13 having vertically movable cores 14, 15 of magnetizable metal. The outer ends of the coils 12 and 13 are connected by conductors 16, 17, and a suitable source of E. M. F., such as the secondary winding 18 of a transformer 19, is connected between center taps of the coils 12 and 13. The primary winding 20 of the transformer 19 is supplied with A. C. from any suitable source, such, for example, as a 110 volt 60 cycle line.

When the bridge is balanced, dependent upon the relative positions of the cores 14 and 15, there will be no difference of potential between the conductors 16—17, produced by the source 18. If, however, the core 14 moves up or down with respect to the core 15 the bridge will be unbalanced and there will be a difference of potential produced by the source 18 across the conductors 16—17 of a relative polarity dependent upon the direction of movement of the core 14. By causing the core 15 also to be moved vertically in the proper direction, the balance may be restored and there will then be no difference of potential between the conductors 16—17, produced by the source 18.

The core 14 is shown connected, as indicated by dotted lines, to a float 11 whose rise and fall in response to liquid level causes the core correspondingly to be raised or lowered.

The core 15 is shown connected, as indicated by dot and dash lines, to the rotor 22 of a translating device (motor 23) which rotor is shown connected also to the pointer of the indicator 10. These connections, indicated by the dot and dash lines, may assume the form of the connections between the core 9a, pointer 7a, and rotor 19, shown at the left hand side of Fig. 1 of Letters Patent of the United States No. 642,662, patented February 6, 1900, A. U. Alcock.

The rotor 22 is so controlled by an unbalance of the above described inductance bridge as to cause the balance to be restored by movement of the core 15. The manner in which this control is effected, and the combination of instrumentalities whereby it is effected, are, however, essentially different from those disclosed in the cited prior patent and essentially different from any prior art of which I am aware.

The conductors 16—17 of the bridge are shown connected to the input of an amplifier 21 whose output is connected to a transformer for controlling the motor 23 (hereinafter described). While amplifiers of more or less stages and of different types may be employed, I have illustrated a somewhat standard type of amplifier comprising two tubes and known as a class A amplifier.

The conductors 16 and 17 are shown connected respectively to the control grid and cathode of a vacuum tube 24. A satisfactory form of such tube is known in the art as RCA-57.

The plate or output circuit of the last stage vacuum tube 27 contains the primary winding 26 of the transformer 25. A satisfactory form of such tube 27 is known in the art as RCA-2A3.

The other connections of the amplifier 21 will be understood by those skilled in the art who are familiar with the symbols employed in the drawing and especially in view of the following description.

The amplifier is connected as shown, the filament transformer and filament-energizing circuits of the tubes being omitted for clarity in illustration. The usual and well known coupling resistances, biasing resistance, blocking and by-pass condensers, etc., are employed. The plate circuits of the tubes 24, 27 are supplied with direct current from the full wave rectifier 28 (which may be a RCA-80 tube) through the filter 29; the filament of the tube 28 being energized by the secondary winding 30 of the transformer 19 and the plates being connected across the transformer secondary winding 31, whose mid-tap is connected to the conductor 17.

The secondary winding 32 of the transformer is connected to the translating device (motor) 23 in a manner presently to be described.

The motor 23 is a motor known in the art as a shading coil induction motor. It comprises the rotor 22 of the squirrel cage type, and a stator 33 (shown in dotted lines) having a main winding 34, and four shading coils 35, 36, 37 and 38. A motor of this general type and construction is disclosed at 25—26—27—28—29—30—31 in Letters Patent of the United States No. 1,895,880, patented January 31, 1933, P. W. Cummings, and also at A—E—5—X—X'—Y—Y' in Letters Patent of the United States No. 2,007,240, patented July 9, 1935, D. N. Crosthwait Jr.; but my motor 23 is so designed, constructed, and controlled that it is essentially different from those of the prior art and also effects improved results.

The number of turns of each of the four shading coils 35—36—37—38 is the same as the number of turns of any of the others of the said four shading coils; but the shading coils are so wound and/or connected that, even with the main winding 34 energized, no current flows through any of the shading coils unless an E. M. F. is induced in the secondary winding 32 by the primary winding 26 of the transformer 25. The four shading coils 35—36—37—38 are shown connected in series with each other and in series with the secondary winding 32. When the main winding 34 is energized there is an E. M. F. induced thereby in each of the four shading coils, but the sum of these so-induced E. M. F.'s is zero in the series circuit and they produce no current flow therein.

As a consequence, when the bridge 12—13 is in balance, i. e. when the entire system is in normal position, no current flows through any of the shading coils.

The reason no current flows in the series circuit 32—35—36—37—38 when no E. M. F. is induced in the secondary 32 by the primary 26, is that the E. M. F.'s induced in the coils 38, 37 by the winding 34 tend to cause current to flow in one direction in the series circuit whereas the E. M. F.'s induced in the coils 36, 35 by the winding 34 tend to cause current to flow in the opposite direction in the series circuit, so that the net result is no flow of current.

However, when an E. M. F. is induced in the secondary winding 32 by change in current in the primary 26, current flows in the shading coil circuit and the coils 35—36 produce a rotative effect upon the rotor 22 in one direction and the coils 37—38 produce a rotative effect upon the rotor 22 in that same direction; i. e. all of the shading coils produce a rotative effect in the same single direction. The E. M. F. induced (by the primary 26) in the secondary 32 adds to the E. M. F.'s induced (by the winding 34) in the coils 35, 36 (or 37, 38) and opposes and preferably exceeds the E. M. F.'s simultaneously induced (by the winding 34) in the other coils 37, 38 (or 35, 36). Of course, whenever current flows in the circuit 32—35—36—37—38, the current is the same in all of the coils, the circuit being a series circuit.

The direction in which the rotor turns when current is supplied to the shading coils from the secondary 32, depends upon the relative direction or phasing of such current with respect to that flowing through the main winding 34. It will be noted that the main winding 34 is connected to the line to which the primary 20 of the transformer 19 is connected.

In arrangements such as that disclosed in the cited Patent No. 1,895,880, only two of the four shading coils are utilized at a time in producing rotor torque or turning effort, the other two being idle. In arrangements such as those disclosed in the cited Patent No. 2,007,240, the turning effort produced by two of the four shading coils is always opposed by the turning effort produced by the other two shading coils and an unbalance or differential action is relied upon to produce rotation of the rotor. But, as stated, in my motor 23, all four of the shading coils are simultaneously utilized to produce torque in the same direction and the action is cumulative and not differential.

The system shown in Fig. 1 is constructed, designed and adjusted so as to operate as follows. Assume that the primary 20 of the transformer 19 is connected to the 110 volt 60 cycle line, that the filaments of the tubes 24 and 27 are being supplied with current through the usual filament current supply apparatus (not shown), and that the parts are in the position shown in the drawing with the bridge 12—13 in balance. No E. M. F. is induced in the secondary winding 32 of the transformer 25, no current flows in the shading coil circuit 32—35—36—37—38, and the rotor 22 remains stationary.

Assume now that the float 11 moves the core 14 up or down, in response to a rise or fall of the liquid whose level is to be indicated. The resultant unbalance of the bridge 12—13 impresses a properly phased voltage on the control grid of the voltage amplifier tube 24 (dependent upon the direction of movement of the core 14) and, in the amplifier 21 of the type disclosed (a class A amplifier), this causes a decrease or increase in the plate current of the tube 27. This change in current flowing through the primary winding 26 induces an E. M. F. in the secondary winding 32 and causes the rotor 22 to turn in such direction as to move the core 15 in such direction as to restore the balance of the bridge 12—13. If the core 14 was moved upwardly by the float 11, the core 15 will be automatically moved upwardly by the rotor 22, and downward movement of the core 14 will result in downward movement of the core 15. When the core 15 has thus been automatically moved by the rotor 22 so as to restore the balance of the controlling bridge circuit 12—13, there is no longer any change in current in the primary winding 26 and the rotor 22 quickly comes to rest by an electric braking action.

Thus the core 15 is automatically caused to repeat any and all movements of the core 14 and the indicator 10 may be calibrated so as to indicate the level of the liquid upon which the float 11 rests. The inductance coil 13 and the indicator 10 and associated apparatus may be remotely located with respect to the float 11 and coil 12.

My system is sensitive and powerful and substantially dead beat. In an actual system constructed as shown and above described, except that a resistance bridge was utilized instead of the inductance bridge illustrated, I have found that even very rapid movements of one of the slides of the control bridge are faithfully and rapidly repeated by the other and rotor-driven slide of the bridge and the torque of the rotor is so powerful as to be more than that required to operate a recorder to which the rotor was also mechanically coupled. Moreover, there is no hunting and the rotor is quite dead beat in its operation. Quite minute changes in the voltage applied to the control grid of the tube 24 produce large changes in the current in the primary winding of the step-down transformer 25 and sensitive and comparatively powerful response by the rotor 22. My invention is therefore not only applicable to indication of liquid level, where considerable lag between float movement and indicator movement is permissible, but it is admirably adapted for use in telemetric and other systems in which great sensitivity, i. e. quickness in response, is required. Withal my system is one which provides ample power at the rotor 22.

Besides other changes which may be made in the particular system disclosed, without departing from the scope of at least some of the appended claims, I have shown, in Fig. 2, a different way of energizing the shading coils, which may be employed in some cases.

In Fig. 2, the parts 122, 133, 134, 135, 136, 137 and 138 correspond generally to the parts 22, 33, 34, 35, 36, 37 and 38, respectively of Fig. 1. Instead of employing one step-down transformer 25, two step-down transformers 125, 225 are employed and their primary windings 126, 226 are connected in series in the plate or output circuit of the tube 27. The secondary winding 132 of the transformer 125 is connected in series with the shading coils 137, 138 and the secondary winding 232 of the transformer 225 is connected in series with the shading coils 135, 136. The shading coils are so wound and/or connected that when the main winding 134 is energized (by connections like those shown for the winding 34 in Fig. 1) and there is no change of current in the primaries 126, 226, the pair of coils 135, 136 tend to rotate the rotor 122 in one direction and the pair of coils 137, 138 tend to rotate the rotor in the opposite direction; these two torques being equal but opposite. However, when an E. M. F. is induced in the secondaries 132, 232 by a change in current in the primaries 126, 226, the current in one set 135, 136 (or 137, 138) of shading coils is increased and the current in the other set 137, 138 (or 135, 136) of shading coils is reversed, so that the torque produced by one set 135, 136 of shading coils is in the same direction as the torque produced by the other set 137, 138 of shading coils. The direction of this combined torque depends upon the phasing of the varying current in the output circuit of the amplifier with respect to that in the main winding 134. The above described reversal of current is attained by causing the E. M. F. supplied by one of the secondaries (132, 232) not only to oppose but to exceed the sum of the E. M. F.'s induced (by the winding 134) in the set of shading coils connected in series with that particular secondary.

It will be understood that the remaining connections not shown in Fig. 2 may be the same as shown in Fig. 1.

As disclosed above, the rotor 22 of the motor 23 is of the squirrel cage type. While other types of rotors, such as, for example, those of the hysteresis or remanence types, with properly designed shading coils, may be employed in certain circumstances and conditions of use, I have found the particular type described above to be satisfactory and I now prefer that type, particularly when comparatively large torque is desired.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claim.

What I claim is:

In combination with an alternating current motor comprising a stator and a rotor and two sets of opposed shading coils, one set tending to induce rotation of the rotor in one direction and the other set tending to induce rotation of the rotor in the other direction, a control element, a second control element remotely located therefrom, means comprising a normally balanced electrical circuit extending from one of said control elements to the other, means responsive to unbalance of said circuit for operating said first control element to restore said balance, said last mentioned means including means for reversing the current in either of said sets of shading coils with respect to the current in the other of said sets of shading coils to cause rotation of the rotor in either desired direction, and means automatically adjusted by the resulting rotation of the rotor for restoring the normal relative flow of current in said shading coils, when said balance is restored.

JOHN R. MacKAY.